United States Patent Office 3,486,960
Patented Dec. 30, 1969

3,486,960
MORTAR COMPOSITIONS AND
METHODS OF USE
John V. Fitzgerald, Metuchen, N.J., and Michael J. Kakos,
New York, N.Y., assignors to Tile Council of America,
Inc., New York, N.Y., a corporation of New York
No Drawing. Filed Sept. 24, 1965, Ser. No. 490,077
Int. Cl. B32b 31/12; C04b 13/24; C09j 3/06
U.S. Cl. 156—297                    8 Claims

ABSTRACT OF THE DISCLOSURE

A method for coating a substrate with tile is provided wherein the tile is adhered to the substrate in spaced edge to edge relationship, the improvement which comprises filling the spaces between the tiles with an adhesive grout prepared by mixing 11 to 40 percent by weight of water with a dry composition comprising hydraulic cement and non-toxic dextrin, said composition having a water retentivity between 15 and 35.

---

This invention relates to improved hydraulic cement mortar compositions, and, more particularly, to improved mortars especially suitable for grouting and setting tile. The invention also relates to methods of preparing these mortars and to methods of using them.

Setting tile and laying up masonry has conventionally been done with mortars cosisting of portland cement, lime and sand with water being added in quantities necessary for proper workability and to take part in the hardening or curing action by means of which the cement forms a gel. The curing of cement, however, takes place over an appreciable period and retention of sufficient water in the mortar to permit the curing action to progress to completion presents several appreciable problems.

Conventional hydraulic cement mortars tend to lose considerable amounts of water first through evaporation to the atmosphere, but much more so through absorption into the tile or masonry which is being set and if the water loss is too great, the curing action is incomplete and the mortar is soft and chalky. To overcome this problem with conventional mortars it is necessary to maintain very wet conditions throughout the tile setting operation, as by pre-soaking absorptive tile to prevent absorbtion of water from the mortar, employing heavy, thick and generally multiple backing layers of mortar for the substrate and maintaining generally humid atmospheric conditions throughout the setting operation.

These setting methods naturally entail substantial amounts of material and considerable labor for mixing, placement and troweling of the substrate and handling the pre-soaked tile. In addition the necessity of maintaining wet conditions for the usual portland cement base mortar tile installations makes impossible or impracticable its use over such substrates as gypsum wallboard or plaster.

In recent years water-retentive mortars have been developed and have been accepted by the trade for the installation of ceramic wall and floor tile. In fact, it is reliably estimated that such water-retentive mortars accounted for 50 percent of the total ceramic tile installed in 1962. These new mortars generally contain small percentages (e.g., 0.5 to 2.0%) from the family of water-soluble cellulose ethers such as methyl cellulose or hydroxyethyl cellulose as the essential water-retentive additive.

Notwithstanding the apparent advantages realized through the development of cellulose ether containing water-retentive mortars, certain disadvantages are associated therewith among which are: (1) the cost of the additive; (2) the necessity of relatively close control of mixing due to gross changes in retentivity found with small variations in the amount of additive, this being especially true since only very small percentages of cellulose ether are added to comparatively large quantities of cement powder: (3) gelation at elevated temperatures which limits the open working time; and (4) increase in setting time of the cement.

The great commercial success and wide acceptance of dry-set mortars as adhesives for porous or water-absorbent materials has resulted in an intensive search in many laboratories for a less expensive or more effective substitute for the cellulose ether additive. The search has been notably unsuccessful, although it is a well known fact that all kinds of glues, caseins, gums, agars, gelatins, pectins, and soluble polymers have been tested for the essential water-retention property. All of these substances thicken water so that capillaries in porous masonry will not suck in the treated water. Nevertheless they fail to function adequately with portland cement because of: (1) the small degree of water retention; (2) the reactivity with the cement constituents; and/or (3) the water sensitivity of the hardened cement.

It is an object of the present invention to provide water retentive agents for incorporation into hydraulic cement to produce highly desirable dry-set mortars suitable for the uses above-mentioned as well as for other uses which will be described hereinafter.

Other objects of the invention will be made clear by the teachings contained herein.

The compositions of this invention are especially suitable for setting and grouting both vitreous and non-vitreous ceramic tile. They cure properly and readily yield strong bonds even under elevated temperature conditions. They provide good bonds between ceramic tile and a wide variety of substrates, such as masonry, gypsum wallboard, concrete and many other types of surfaces under various installation conditions.

The compositions are also thin-setting, that is, they can be used in setting beds in dry environments which are relatively much thinner than those required with conventional hydraulic cement mortars.

It has been found that the foregoing objects can be realized through the utilization of non-ionic dextrin. The dextrin may be incorporated into the mortar either by admixing with the dry cement or with the water prior to intermixing the cement and water.

Starch is a naturally occurring, high-polymeric carbohydrate composed of glucopyranose units joined together by $\alpha$ (alpha)-glucosidic linkages. It is commercially extracted from grains (corn, sorghum, wheat, rice), from roots or tubers (potato, cassava or tapioca, arrowroot) and from the pith of the sago palm. The approximate formula is $(C_6H_{10}O_5)_n$, where $(n)$ is probably greater than one thousand. Starch occurs in the form of white granules, usually made up of both a linear polymer (amylose) and a branched polymer (amylopectin). The granules are organized mixtures of the two types of polymers so oriented and associated in a crystal-like lattice that they are insoluble in cold water and are comparatively resistant to naturally occurring hydrolytic agents as enzymes.

Insoluble or regular starch is modified as described below to produce the modified, cold water swelling or soluble dextrin suitable for use herein.

Dextrin

Dextrins are produced from dry starch by roasting either alone or in the presence of acid. The properties obtained, as a result of the degradation-recombination reactions, vary depending on the treatment. For the most part the products have low to intermediate viscosity, good stability against gelling, and partial to complete cold-water solubility. Although water-dextrin systems are considered as colloidal dispersions, common practice has been to refer to these as solutions. The more highly converted dextrins will contain large quantities of material that are water-soluble in the usual sense.

Three types of chemical transformations predominate during the conversion of starch to dextrin: (1) hydrolysis of glucose linkages, which reduces the size of molecules; (2) rearrangement of molecules by breaking and reforming glucose-glucose linkages to give increased branches; and (3) repolymerization of small fragments to larger molecules by catalytic action of high temperature and acid. These transformations are essentially controlled by the conversion time, temperature and amount of acid. Manipulation of these variables governs the type of dextrin produced. Three types are commercially available: white and yellow dextrin, and British gum.

British gums are obtained by heating starch with only a slight adjustment in the pH value while the white and yellow dextrins are the products obtained by partial hydrolysis with heating. The yellow (canary) dextrins are more highly converted products than the white dextrin with water solubility, greater than 85 percent and usually more than 90 percent. Water solubility for white dextrins range from 5 to 90 percent though solution viscosities usually run higher than found with yellow dextrins.

Obviously, the more soluble the particular dextrin the more desirable it is for use herein.

Aside from water solubility, another essential property of the dextrin to be used herein is that it be *non-ionic*. Starches containing functional groups such as carboxyl, sulfonate or sulfate in the form of sodium or ammonium salts have a high affinity for water which results in high viscosity, clear, non-gelling dispersions. However, due to the high ionic concentration and the high pH of portland cement, such ionic starches are incompatible therewith and lead to gelling of the mortar slurry or flocculation. The latter effect is due to precipitation of the starch.

It has been found that the dextrin containing mortars of this invention require surprisingly small amounts of water to attain workable viscosities. Since water in excess of that required for hydration of portland cement is usually lost through evaporation and contributes to undesirable shrinkage, the low water requirement is an unexpected advantage.

Although a wide variety of hydraulic cements may be used, best results are achieved with portland cement, and this is preferred. The amount of cement in the compositions may vary from about 24 to 97 percent by weight.

The amount of dextrin may vary between 3 percent and 20 percent based on the weight of the hydraulic cement in the composition, and preferably between 4 and 10 percent, based on the weight of hydraulic cement.

Non-ionic wetting agents such as alkylaryl polyether alcohol and alkali carbonates, e.g., sodium and potassium carbonate, added in amounts varying from 5 percent to 15 percent, based on the weight of starch derivative in the composition, may be used to obtain more rapid wetting of the dry mixture.

to effect economy, decrease shrinkage, and for other purposes. Fillers such as perlite, talc, pyrophyllite, various clays, diatomaceous earth, and pigments, such as titanium Inert aggregates, such as sand and limestone may and usually are incorporated into the compositions disclosed dioxide, zinc oxide, aluminum oxide, powdered barytes, and the like, may also be used.

The amount of fillers, aggregate, and pigments incorporated into the compositions may vary up to about 400 percent based on the weight of the hydraulic cement, but is preferably between about 10 and 75 percent based on the weight of the dry mortar composition. When sand is used, for example, this is preferably introduced in amounts up to 75 percent, preferably between about 10 percent and 75 percent, based upon the weight of the dry composition, whereas when limestone is used, this is preferably introduced in amounts up to 45 percent, preferably between about 10 and 45 percent by weight of the dry composition.

The compositions may also include, if desired, other polymeric additives such as dimethylol urea, melamineformaldehyde resins, polyvinyl alcohol and the like, to insolubilize the starch in the hardened cement and for other purposes.

Additions of alkaline earth metal halides, such as the chlorides, iodides, bromides, and fluorides of alkaline earth metal, e.g., calcium, magnesium, strontium and barium, including mixtures of such salts, may be made if desired, to increase speed of gelation in a manner well known in the art.

When the compositions are to be used for placing tiles on vertical surfaces, it has also been found desirable to include asbestos fibers in the composition in amounts of less than about 5 percent based on the weight of the hydraulic cement.

In making the compositions, the hydraulic cement and starch derivatives, disclosed herein, with or without the modifying ingredients, disclosed hereinabove, are dry mixed to form dry compositions which are readily activatable upon addition of water to produce grouts and mortars having the properties described hereinabove.

In general, the amount of water added to the dry compositions to produce improved grouts and mortars may vary from about 11 to 40 percent based on the weight of the dry composition, and depending upon the amount of modifying ingredients present. Usually, the amount of water added will be between about 18 and 35 percent based on the weight of the dry composition.

Examples of the improved mortar compositions of the present invention and the improved technique of using them will now be given.

Water retentivity

Water retentivity values were obtained on portland cement containing various amounts of the modified starches described hereinabove. This property was measured by placing a ⅛" layer of the mix previously slurried with the specified amount of water on the porous side of a quartered 4¼" x 4¼" Commercial Standard 181 glazed wall tile. A thin glass slide was placed over the mortar

TABLE 1

Retentivity values for various starch-grey portland cement combinations. Starch is expressed as percent of total mix. Water is expressed as percent of weight of dry mix.

| Starch Identification | Amount, percent | Starch | Water requirement, percent | Retentivity |
|---|---|---|---|---|
| Modified tapioca Dextrin | 5.0 | Crystal gum [1] | 25 | 45.0 |
| Yellow corn Dextrin | 5.0 | C.P. 8051 [2] | 20 | 91.0 |
| 50% soluble white Dextrin | 5.0 | 600 Dextrin [3] | 25 | 33.0 |
| 85% soluble white Dextrin | 5.0 | 653 Dextrin | 22 | 71.0 |
| 95% soluble yellow Dextrin | 5.0 | 700 Dextrin | 25 | 118.0 |
| White corn Dextrin | 5.0 | 7071 Globe Dextrin [2] | 21 | 52.0 |

[1] National Starch and Chemical Corp.
[2] Corn Products Co.
[3] Clinton Corn Processing Co.

layer and the assembly positioned under a microscope lens. As the water left the mortar travelling into the porous bisque of the tile, the mortar layer contracted thereby causing the slide to be displaced downward. This displacement could be accurately measured with a microscope and plotted against the square root of time. The slope of the straight line divided into 1000 yielded the retentivity values listed in Table 1. Most proprietary dry-set mortars measured in this manner have retentivity values in the range between 35 and 50, whereas dry wall grouts generally measured between 15 and 35.

Example 1

The dry mixture:

| | Percent |
|---|---|
| Grey portland cement | 93.0 |
| White dextrin—85% soluble (Clinton Dextrine 653) | 5.0 |
| Dimethylol urea | 1.0 |
| Calcium chloride | 1.0 | was slurried with 28 percent by weight of dry mix, of water. The mix became prematurely stiff, presumably because of the absence of a wetting agent. Consequently, another 3 percent of water was necessary to obtain the desired consistency again. After 30 minutes the mix was re-mixed. It was then trowelled onto a vertical, rigidly supported gypsum wallboard surface using a 1/8" square notched trowel with 1/8" flats, so as to obtain an average mortar thickness of 1/16". At five minute intervals a standard grade 4¼" x 4¼" glazed wall tile (water absorption of about 13 percent) was pressed onto this mortar surface and twisted through a 90° angle. Open time was recorded as the longest time after application of the mortar that a tile was retained on the surface when so applied. When carried out at 70° F. and 50 percent R.H., the open time for this mix was 50 minutes, which is quite acceptable.

Example 2

Using the same composition presented in Example 1 but allowing the mortar mix to slake for an additional hour, the following test was performed. The mortar was trowelled onto the surface as described in Example 1. Immediately thereafter, 10 tiles described in Example 1, were pressed on the mortar with a 3" space between each tile. At five minute intervals successive tiles were twisted through an angle of 90° and back to the original position. Adjustability of the mortar was then designated as the longest time that tile remained affixed to the mortar when so tested. For the test at 70° F. and 50 percent R.H., the adjustability for the mortar was recorded as 40 minutes which is quite acceptable.

Example 3

The dry mixture:

| | Percent |
|---|---|
| Grey portland cement | 91.3 |
| (Corn Products' 8051 Dextrine) yellow dextrin 95% soluble | 4.0 |
| Calcium chloride | 1.0 |
| Asbestos | 2.0 |
| Alkylaryl polyether alcohol (Triton X-120) | 0.5 |
| Dimethylol urea | 1.2 | and 2 parts mason's sand and 1 part of this dry mix were slurried with enough water to give a consistency which, when trowelled on a dry substrate, with a notched trowel, gave a rigid, nonflowing rib formation.

Shear test specimens were prepared from pieces of glazed ceramic tile of dimensions 4¼" x 2⅛", which were halved sections of standard 4¼" tile of about 13 percent water absorption. A 1/8" unsanded mortar bonding layer was used. In preparing the specimens the long side (factory finished edge with lugs ground off) was offset approximately ¼" so that 8 square inches of each tile were covered with mortar. The specimens were allowed to cure and were then shear tested after 7 days, 28 days, and 7 days dry plus 7 days water soak. The shear test was performed by compression loading (2400 pounds per minute) on the offset edge of the vertically placed specimen.

The sanded mortar was used to prepare vitreous tile shear bond specimens, 2" x 2" natural clay ceramics with water absorption of about 1.5 percent being used. The sample preparation and testing method were similar to those described above.

Results of the shear bond tests for both sets of samples are summarized below.

| | 7 Days | 7 Days Dry plus 7 Days Water | 28 Days |
|---|---|---|---|
| Average 4 wall tile (non-sanded mortar), p.s.i. | 94 | 48 | 133 |
| Average 4 vitreous tile (sanded mortar), p.s.i. | 57 | 36 | 37 |

Example 4

The following composition was prepared:

| | Percent |
|---|---|
| Grey portland cement | 94.0 |
| White dextrin 85% soluble (Clinton Dextrin 653) | 5.0 |
| Dimethylol urea | 1.0 |

The dry composition was slurried with 28 to 30 percent of its weight of water to prepared mortar. The mortar prepared from the composition could be readily trowelled over dry gypsum wallboard, cinder or cement block, cement asbestos board, poured concrete block or plaster to form a ½" to 1/16" thick, smooth, adhered layer of mortar that did not lose appreciable water to the backing. Dry, porous, non-vitreous tile could be set, without prior water soaking, over this mortar layer. After several days time allowed for curing, a hard mortar layer was obtained which showed strong bonding to both the tile and the backing.

In using the compositions described herein to install ceramic tiles, the substrate is covered with a bed of mortar produced as described hereinabove and the dry tile pressed into the bed and cured, forming a hard adhesive bond between the tile and the substrate. The bed of mortar utilized may vary in thickness from about 1/16" to ½". If desired, the back of the tiles can be given a thin coat of the mortar prior to being set in the mortar bed. In using the compositions described as a pointing compound, the tile is bonded onto a substrate, for example, as indicated above, in spaced relationship, and the compositions are placed as by rubbing into the spaces between the dry tiles, and cured forming a hard crack-free joint between the tiles.

In utilizing the improved mortar compositions in accordance with the present invention, it may be desirable to use an aqueous mixture of dextrin described herein for mixing with hydraulic cement which has not been pre-blended with said starch derivatives at the factory. This would not be the preferred method but would permit utilization of the improved mortar compositions with hydraulic cements not normally available in pre-blended form. In addition where polymeric water base latex additives, rather than water, are to be added to the hydraulic cement on the job-site to prepare the mortar, incorporation of the starch derivatives described herein with the latex may offer advantages. The following example is illustrative of the technique:

Example 5

The following solution was prepared:

15 weight parts yellow (canary) dextrin—95% soluble (Clinton Dextrin 700)
100 weight parts of water The dextrin mixture was admixed with 350 weight parts of grey portland cement to prepare mortars. The mortars could be readily trowelled over dry gypsum wallboard, cinder or cement block, cement asbestos board or plaster to form a ½" to ⅟₁₆" thick, smooth layer of mortar that did not lose appreciable water to the backing. Dry, porous, non-vitreous glazed wall tile could be set, without prior water soaking, over this mortar layer. After several days time allowed for curing, a hard mortar layer was obtained which showed strong bonding to both the tile and the substrate.

What is claimed:

1. In a method for coating a substrate with tile wherein the tile is adhered to the substrate in spaced edge to edge relationship, the improvement which comprises filling the spaces between the tiles with an adhesive grout prepared by mixing 11 to 40 percent by weight of water with a dry composition comprising 24 to 97 percent on a dry weight basis of hydraulic cement and 3 to 20 percent by weight of non-ionic dextrin based on the hydraulic cement, said composition having a water retentivity between 15 and 35.

2. The method of claim 1, in which the amount of dextrin in said composition is between about 4 to 10 percent by weight, based on the hydraulic cement.

3. The method of claim 1, in which the hydraulic cement is portland cement.

4. The method of claim 1, in which the adhesive grout comprises an inert aggregate.

5. A method of installing tile which comprises covering a substrate with a bed of mortar prepared by admixing 11 to 40 percent by weight of water with a dry composition comprising 24 to 97 percent on a dry weight basis of hydraulic cement and 3 to 20 percent by weight of non-ionic dextrin based on the hydraulic cement, said mortar having a water retentivity of between 35 and 50, and pressing tile into said bed in spaced edge to edge relationship.

6. The method of claim 5, in which the amount of non-ionic dextrin in said composition is between about 4 to 10 percent by weight, based on the hydraulic cement.

7. The method of claim 5, in which the hydraulic cement is portland cement.

8. The method of claim 5, in which the mortar comprises an inert aggregate.

References Cited

UNITED STATES PATENTS

| | | | |
|---|---|---|---|
| 2,374,628 | 4/1945 | Swayze | 106—92 |
| 2,429,211 | 10/1947 | Andes | 106—92 |
| 2,470,505 | 5/1949 | Ludwig | 106—92 |
| 2,489,793 | 11/1949 | Ludwig | 106—92 |
| 2,562,148 | 7/1951 | Lea et al. | 106—92 |
| 2,576,955 | 12/1951 | Ludwig | 106—92 |
| 2,934,932 | 5/1960 | Wagner | 106—93 |
| 3,243,307 | 3/1966 | Selden | 106—93 |

FOREIGN PATENTS 418,998   3/1944   Canada.

JAMES E. POER, Primary Examiner

WATSON T. SCOTT, Assistant Examiner

U.S. Cl. X.R.

106—90, 92, 93, 97; 156—299, 304

UNITED STATES PATENT OFFICE
CERTIFICATE OF CORRECTION

Patent No. 3,486,960                                    December 30, 1969

John V. Fitzgerald et al.

It is certified that error appears in the above identified patent and that said Letters Patent are hereby corrected as shown below:

Column 1, line 19, "toxic" should read -- ionic --. Column 2, line 5, "powder:" should read -- powder; --. Column 4, line 1 beginning with "to effect economy" cancel all to and including "disclosed" in line 5, same column 4, and insert instead -- Inert aggregates, such as sand and limestone may and usually are incorporated into the compositions disclosed to effect economy, decrease shrinkage, and for other purposes. Fillers such as perlite, talc, pyrophyllite, various clays, diatomaceous earth, and pigments, such as titanium --.

Signed and sealed this 3rd day of November 1970.

(SEAL)
Attest:

EDWARD M. FLETCHER, JR.                     WILLIAM E. SCHUYLER, JR.
Attesting Officer                              Commissioner of Patents